US012726482B2

(12) United States Patent
Tu et al.

(10) Patent No.: US 12,726,482 B2
(45) Date of Patent: Sep. 1, 2026

(54) ROLE-BASED ACCESS CONTROL SYSTEM FOR REMOTE NETWORK SERVICES

(71) Applicant: Calix, Inc., San Jose, CA (US)

(72) Inventors: Youwu Tu, Nanjing (CN); Yongsheng Xue, Nanjing (CN); Tian Deng, Nanjing (CN)

(73) Assignee: Calix, Inc., San Jose, CA (US)

( * ) Notice: Subject to any disclaimer, the term of this patent is extended or adjusted under 35 U.S.C. 154(b) by 34 days.

(21) Appl. No.: 18/621,877

(22) Filed: Mar. 29, 2024

(65) Prior Publication Data

US 2025/0310337 A1 Oct. 2, 2025

(51) Int. Cl.

| | |
|---|---|
| ***G06F 15/16*** | (2006.01) |
| ***H04L 9/40*** | (2022.01) |
| ***H04L 43/08*** | (2022.01) |
| ***H04L 67/141*** | (2022.01) |

(52) U.S. Cl.

CPC ............ *H04L 63/102* (2013.01); *H04L 43/08* (2013.01); *H04L 63/083* (2013.01); *H04L 63/1416* (2013.01); *H04L 67/141* (2013.01)

(58) Field of Classification Search

None

See application file for complete search history.

(56) References Cited

U.S. PATENT DOCUMENTS

| | | | | |
|---|---|---|---|---|
| 9,313,196 | B2 * | 4/2016 | Pritchard, Jr. | H04L 63/083 |
| 11,979,422 | B1 * | 5/2024 | Kapoor | G06F 21/554 |
| 2019/0089748 | A1 * | 3/2019 | Manor | H04L 63/205 |
| 2019/0318100 | A1 * | 10/2019 | Bhatia | G06F 21/554 |

* cited by examiner

*Primary Examiner* — Phuoc H Nguyen

(74) *Attorney, Agent, or Firm* — Patterson + Sheridan, LLP

(57) ABSTRACT

The disclosure provides an approach for role-based access control for remote network services. Embodiments include initiating, by a network element in a network, a connection to a service provider system outside of the network. Embodiments include receiving, by the network element from the service provider system via the connection in response to the initiating, a login request comprising a user identifier. Embodiments include determining, by the network element, one or more permissions associated with a role corresponding to the user identifier. Embodiments include approving, blocking, or delaying approval of the login request, by the network element, based on the one or more permissions.

18 Claims, 6 Drawing Sheets

602
INITIATE, BY A NETWORK ELEMENT IN A NETWORK, A CONNECTION TO A SERVICE PROVIDER SYSTEM OUTSIDE OF THE NETWORK

604
RECEIVE, BY THE NETWORK ELEMENT FROM THE SERVICE PROVIDER SYSTEM VIA THE CONNECTION IN RESPONSE TO THE INITIATING, A LOGIN REQUEST COMPRISING A USER IDENTIFIER

606
DETERMINE, BY THE NETWORK ELEMENT, ONE OR MORE PERMISSIONS ASSOCIATED WITH A ROLE CORRESPONDING TO THE USER IDENTIFIER

608
APPROVE, BLOCK, OR DELAY APPROVAL OF THE LOGIN REQUEST, BY THE NETWORK ELEMENT, BASED ON THE ONE OR MORE PERMISSIONS

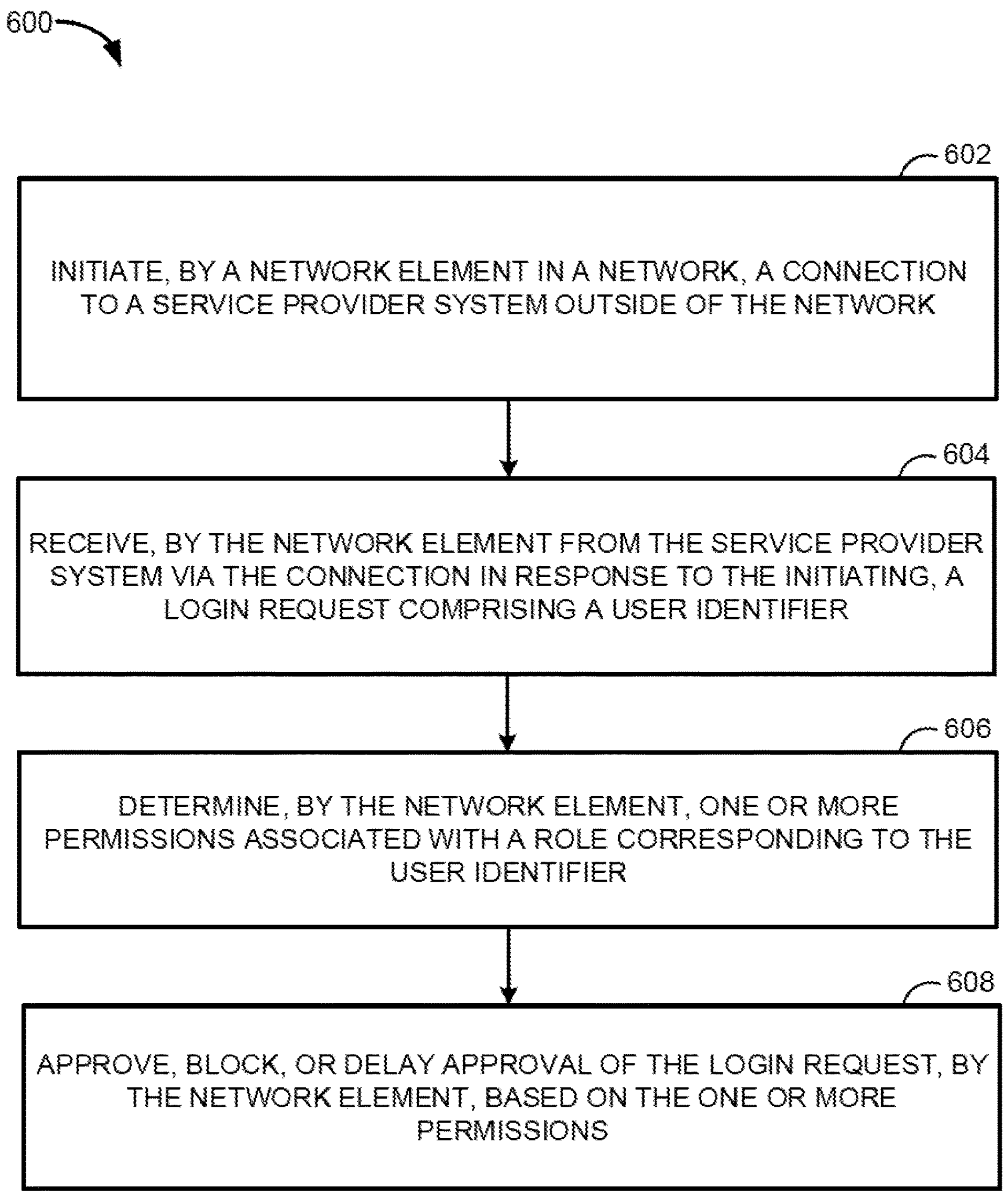

FIG. 6

ROLE-BASED ACCESS CONTROL SYSTEM FOR REMOTE NETWORK SERVICES

BACKGROUND

A network may include a variety of network elements, such as routers, switches, gateways, firewalls, load balancers, optical line terminals (OLTs), broadband network gateways (BNGs), and aggregation switches. Such network elements may be monitored, configured, and/or otherwise managed by one or more components within the network and/or outside of the network. For example, some management functionality may be performed by an on-premises service provider system while other management functionality may be performed by an external cloud-based service provider system.

External components cannot generally initiate a connection to a network element inside of a private network. Thus, enabling network elements within a private network to be managed by an external service provider system may involve a "call home" procedure in which a network element initiates a connection to the external service provider system and the external service provider system uses the connection to send a login request to the network element.

While call home procedures allow for the use of cloud-based or other external service provider systems to be used for management of network elements in a private network, existing call home techniques may have certain security vulnerabilities. For example, enabling an outside entity to access network elements within a private network may present opportunities for such access to be exploited in order to gain access to private data and components. Additionally, even though existing techniques generally involve the outside component providing some sort of credential that is authenticated prior to granting access to a network element, it may be possible for such a credential to be guessed (e.g., through brute force) or otherwise obtained by an unauthorized party.

BRIEF DESCRIPTION OF THE DRAWINGS

FIG. 6 depicts example operations for role-based access control for remote network services, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
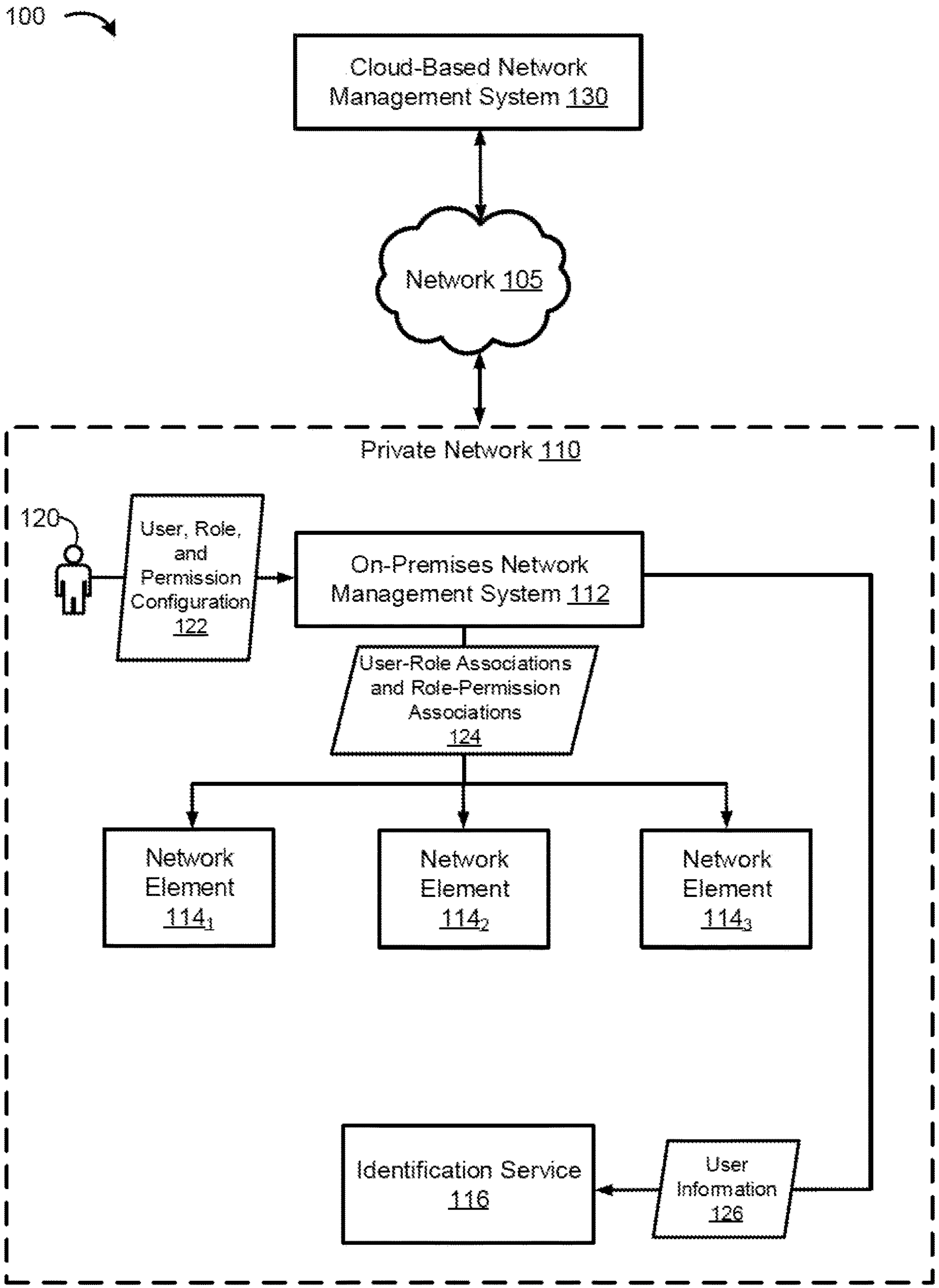
FIG. 1 is an illustration of an example networking environment in which operations related to role-based access control for remote network services may be performed, according to certain embodiments.

The present disclosure relates to role-based access control for remote network services. For example, the present disclosure provides an approach for using configured user roles and permissions for controlling access by an external service provider system, such as a cloud-based management component, to network elements within a private network that have initiated a connection to the external service provider system.

A call home process generally involves a network element from within a private network initiating a connection to a service provider system outside of the private network, and the service provider system using the connection to send a login request, including a user credential (e.g. username and password) to the network element. In existing call home processes, the user credential may be authenticated (e.g., ensuring that the user credential corresponds to an actual user associated with the private network), but no further access control is typically performed. Thus, with existing techniques, an unauthorized party may be able to gain access to the network element within the private network by obtaining or guessing any valid user credential associated with the private network. Techniques described herein overcome this technical problem of network security vulnerability through a role-based access control mechanism.

For example, as described in more detail below with respect to FIG. 1, an administrator may configure particular roles having specific permissions, and may assign particular users to the configured particular roles. Examples of roles may include, for example, administrator, manager, viewer, tester, standard user, limited user, custom, and/or the like. Examples of permissions may include, for example, configuration of network elements, read-only access to particular types of data or components, read/write access to particular types of data or components, call home, and/or the like.

In some embodiments, the administrator may configure roles and permissions via a centralized component, such as an on-premises service provider system (e.g., network management system). Associations between users and roles and associations between roles and permissions may be distributed by the centralized component to the individual network elements so that the network elements can determine whether a user attempting to log in (e.g., in connection with a call home procedure) has permission to perform the requested operation(s).

As described in more detail below with respect to FIG. 2, an administrator may configure a network element as a call home client and may configure an external service provider system as a call home server. The network element may then initiate a call home procedure (e.g., in accordance with configuration information specified by the administrator) by establishing a connection such as a transport control protocol (TCP) connection with the external service provider system. The external service provider system may then attempt to log in to the network element by sending a user credential (e.g., based on configuration information specified by the administrator) to the network element via the connection that was established. The network element may authenticate the user credential, such as through interaction with an identification service, and may also perform a permission check.

As described in more detail below with respect to FIGS. 3 and 4, a permission check may involve the network element determining any roles assigned to the user (e.g., the user indicated by the user credential) and determining any permissions associated with any such roles. For example, the network element may determine whether the user has permission to initiate a call home procedure. If the user has such permission, the network element may respond to the external service provider system with an indication that the user is authenticated, and a connection such as a secure shell (SSH) or hypertext transfer protocol secure (HTTPS) connection may be established between the network element and the external service provider system. Such a connection may enable the external service provider system to perform functionality, such as related to network monitoring and/or management, with respect to the network element.

Additionally, as described in more detail below with respect to FIG. 5, behavior within the private network, such as related to the call home procedure, may be analyzed on an ongoing basis in order to detect abnormal or potentially problematic behavior patterns. For example, as an added security measure, the on-premises service provider system may receive operation records and/or statistics from various components such as network elements and an identification service, and may analyze these operation records and/or statistics (e.g., according to rules, using machine learning, and/or otherwise according to configured logic) in order to determine whether any abnormal operations or operation patterns occur. The on-premises service provider system may take remedial action if an abnormal condition is detected, such as alerting an administrator and/or changing role and/or permission configurations dynamically in order to prevent security threats. For instance, if the on-premises service provider system detects an operation pattern that indicates a potential attempt to brute force guess a user credential of a particular user, the on-premises service provider system may dynamically modify role(s) and/or role permission(s) associated with the particular user, such as to prevent the particular user's information from being used to establish a call home session. In another example, if the on-premises service provider system detects an operation pattern that indicates a potential attempt to brute force guess a user credential, the on-premises service provider system may block the login request(s) (e.g., which may be from a malicious source).

Embodiments of the present disclosure improve upon existing call home techniques for networking environments, in which an external component may be required to provide a valid user credential but in which any valid user is generally able to establish a call home session between the external component and a network element within a private network. For example, techniques described herein improve upon existing techniques by providing a role-based access control mechanism that enables an administrator to configure particular roles with particular permissions such that only an external component having a user credential associated with a user having a role with sufficient permissions is able to successfully connect to a network element in the private network via a call home procedure. Thus, embodiments described herein enable external service provider systems to be used to provide services to network elements within a private network in a manner that preserves the security of data and components within the private network and prevents unauthorized access to such data and components. There are many reasons why it is advantageous to use external service provider systems, such as to gain access to updated or additional functionality, cross-network insight, external computing resources, and/or the like. Embodiments of the present disclosure allow such benefits to be gained in a manner that overcomes computing security challenges associated with existing techniques.

Furthermore, by enabling centralized configuration and management of role-based permissions that are then synchronized with one or more network elements, techniques described herein allow such permissions to be efficiently created and updated without duplication of effort and computing resource utilization, while further improving computing security by allowing such permissions to be adapted quickly in a centralized manner based on changes in the networking environment, such as detected problematic behavior. Additionally, by analyzing behavior associated with a call home procedure over time to detect abnormal or otherwise potentially problematic behavior, techniques described herein further improve computing security by allowing security threats to be dynamically detected and prevented in an automated or semi-automated manner even when such threats would not have been detected using conventional techniques. Accordingly, embodiments of the present disclosure dynamically prevent exploitation of call home procedures by unauthorized entities when such exploitation may not have been detected or prevented with conventional techniques.

FIG. 1 is an illustration 100 of an example networking environment in which operations related to role-based access control for remote network services may be performed, according to certain embodiments.

In illustration 100, a private network 110 is connected to a cloud-based network management system (NMS) 130 via a network 105. Private network 110 generally represents a network environment that implements restrictions on access to endpoints within the network environment from outside of the network environment, such as via one or more firewalls, gateways, and/or other components. For example, private network 110 may be controlled by a particular user or entity, such as a business or other organization, that does not want outside entities having unauthorized access to data and/or components within private network 110. Network 105 may be any connection over which data may be transmitted, such as the Internet.

Cloud-based NMS 130 generally represents a component that is configured to provide one or more types of functionality with respect to network elements within one or more networks, such as monitoring, configuration, and/or other types of network element management functionality. It is noted that while certain embodiments described herein refer to a cloud-based NMS, techniques described herein may be used for other types of external components that are configured to provide some type of service to network elements within a network. Cloud-based NMS 130 may be implemented as one or more physical computing devices and/or one or more virtual computing devices and/or software components running on one or more physical computing devices such as a server.

Private network 110 includes network elements 114$_1$, 114$_2$, and 114$_3$, which may be referred to collectively as network elements 114 and individually as network element 114. Each network element 114 may be a component that performs functionality related to private network 110, such as a gateway, router, switch, firewall, security component, load balancer, optical line terminal (OLT), broadband network gateway (BNG), aggregation switch, and/or the like. Network elements 114 may be physical devices and/or virtual devices (e.g., virtual machines, containers, and/or the like) running on one or more physical devices, and/or may represent functionality implemented via software and/or hardware.

Private network 110 further includes an on-premises network management system (NMS) 112, which generally represents a component that is configured to provide one or more types of functionality with respect to network elements within private network 110, such as monitoring, configuration, and/or other types of network element management functionality. For example, on-premises NMS 112 may be similar to cloud-based NMS 130, but may be more focused on an individual network and/or may provide different functionality compared to that provided by cloud-based NMS 130. In one example, cloud-based NMS 130 provides cross-network functionality, additional features, and/or additional physical computing resources beyond those provided by on-premises NMS 112. On-premises NMS 112 may be implemented as one or more physical computing devices and/or one or more virtual computing devices and/or software components running on one or more physical computing devices such as a server within private network 110.

An administrator 120 of private network 110 may provide user, role, and permission configuration information 122 to on-premises NMS 112. For example, user, role, and permission configuration information 122 may include one or more user identifiers and/or credentials, role definitions with one or more permissions assigned to each role, assignments of roles to users, and/or the like. In one embodiment, administrator 120 interacts with a user interface associated with on-premises NMS 112 in order to specify user, role, and permission configuration information 122. In another embodiment, administrator 120 provides a configuration file or other type of input specifying user, role, and permission configuration information 122. In certain embodiments, a default configuration allows all roles to manage and/or perform specific operations with respect to a given device (e.g., network element 114), while a specific configuration can limit permission to manage and/or perform specific operations with respect to the given device to certain roles.

On-premises NMS 112 may serve as a centralized management point for role-based access control, and may transmit aspects of user, role, and permission configuration information 122 to the network elements 114 that are managed by on-premises NMS 114. For example, on-premises NMS 112 may transmit user-role associations and role-permission associations 124 to network elements 114. User-role associations and role-permission associations 124 may include one or more associations between users and roles and one or more associations between roles and permissions. On-premises NMS 112 may provide user information 126, such as user identifiers and user credentials (e.g., specified via user, role, and permission configuration information 122), to identification service 116. For example, identification service 116 may run on one or more physical computing devices, and may serve as a user authentication component. In some embodiments, user credentials are not provided to network elements 114, and are only provided to identification service 116 (e.g., to avoid spreading sensitive credential information across multiple entities and/or so that credentials may be maintained by a single entity and credential changes can be efficiently made without distributing such changes to multiple entities).

Network elements 114 may store user-role associations and role-permission associations 124 for use in verifying that users attempting to login (e.g., from cloud-based NMS 130 or other endpoints as a part of a call home procedure) have sufficient permission, as described in more detail below with respect to FIG. 2.

While not shown, one or more additional network environments may be connected to private network 110. For example, an additional private network may be connected to private network 110 via a secure connection such as a virtual private network (VPN) connection. In such an embodiment, on-premises NMS 112 in private network 110 may perform role-based call home access control functionality for the additional private network as well, such as transmitting user-role associations and role-permission associations 124 to network elements in the additional network via the secure connection. Identification service 116 may also perform user authentication functionality for the additional private network, such as receiving authentication requests from network elements in the additional private network via the secure connection and responding appropriately.

Additionally, as described in more detail below with respect to FIG. 5, on-premises NMS 112 may receive data related to operations throughout private network 110 (and, in some embodiments, one or more additional private networks securely connected to private network 110) and/or cloud-based NMS 130, and may analyze the data to determine whether abnormal behavior has occurred, such as to detect potential security threats and take remedial action. Such remedial action may include, for example, changing user-role associations and role-permission associations 124, providing an alert to administrator 120, blocking a connection or user authentication, and/or the like.

Figure 2:
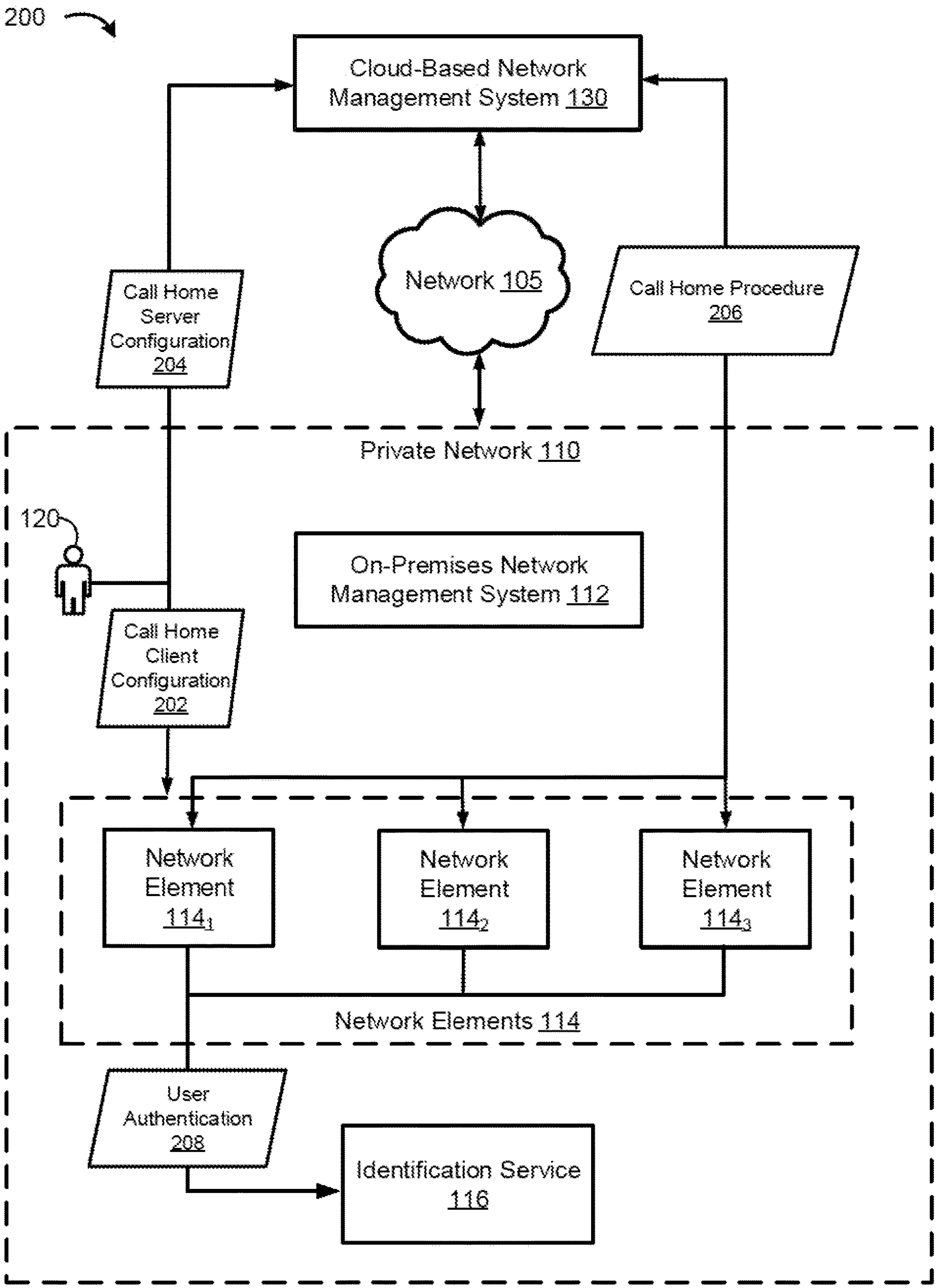
FIG. 2 is an illustration of an example networking environment in which operations related to role-based access control for remote network services may be performed, according to certain embodiments.

FIG. 2 is an illustration 200 of a networking environment in which operations related to role-based access control for remote network services may be performed, according to certain embodiments. Illustration 200 includes cloud-based NMS 130, network 105, private network 110, administrator 120, on-premises NMS 112, network elements 114, and identification service 116 of FIG. 1.

Administrator 120 may provide a call home client configuration 202 to one or more of network elements 114, and may provide a call home server configuration 204 to cloud-based NMS 130. In a call home procedure, the local component (e.g., network element 114) may be referred to as a call home "client" and the remote component (e.g., cloud-based NMS 130) may be referred to as a call home "server".

Call home client configuration 202 generally includes an indication of the name of the call home server, a call home type such as secure shell (SSH) or transport layer security (TLS), an address of the call home server such as an internet protocol (IP) address or fully qualified domain name (FQDN), a port associated with the call home server, one or more permitted roles of the call home server such that only users associated with the one or more permitted roles can access the call home client, and/or the like.

Call home server configuration 204 generally includes an identifier of the call home client such as a media access control (MAC) address or other unique device identifier, a call home service display name, a user identifier (e.g., user name), a user credential (e.g., password), a connection timeout, and/or the like.

One or more network elements 114 may initiate a call home procedure 206 based on call home client configuration 202. For example, a network element 114 may send a connection request such as a transport control protocol (TCP) connection request to cloud-based NMS 130 based on the name, address, and/or port of the call home server indicated in call home sever configuration 202 to establish a connection of a type (e.g., SSH or TLS) indicated in call home client configuration 202. As described in more detail below with respect to FIGS. 3 and 4, cloud-based NMS 130 may establish the requested connection with the network element 114, and may send an authentication request containing a user identifier and user credential to the network element 114, such as via the established connection.

For example, cloud-based NMS 130 may determine the user identifier and user credential to include in the authentication request based on call home server configuration 204 and based on an address (e.g., MAC address) of the network element 114 that is included in the connection request sent by the network element 114. For example, if cloud-based NMS 130 has received multiple call home server configurations corresponding to different network elements, cloud-based NMS 130 may determine which call home server configuration is applicable based on the address of the network element 114 that is included in the connection request sent by the network element 114.

The network element 114 may perform user authentication 208 via identification service 116. For example, the network element 114 may send the user identifier and user credential in the authentication request received from cloud-based NMS 130 to identification service 116 along with a request to authenticate the user. Identification service 116 may determine whether the user identifier and user credential match a user identifier and user credential pair stored by identification service 116 and, if so, may respond to the network element 114 with an indication that the user is authenticated. If the user identifier and user credential do not match a user identifier and user credential pair stored by identification service 116, then identification service 116 may respond to the network element 114 with an indication that the user is not authenticated.

Furthermore, the network element 114 may perform a permission check to ensure that the user has permission to access, manage, or otherwise engage in a call home procedure with the network element 114. For example, as described in more detail below with respect to FIGS. 3 and 4, the network element 114 may determine whether one or more roles associated with the user are associated with a relevant permission. If the permission check is successful, the network element 114 may respond to cloud-based NMS 130 with an indication that authentication was successful, and the call home procedure 206 may continue (e.g., with cloud-based NMS 130 performing management functionality with respect to the network element 114). Otherwise, if the permission check is not successful, the network element 114 may respond to cloud-based NMS 130 with an indication that the user is not authenticated or approved, and the connection between the network element 114 and cloud-based NMS 130 may be discontinued.

Figure 3:
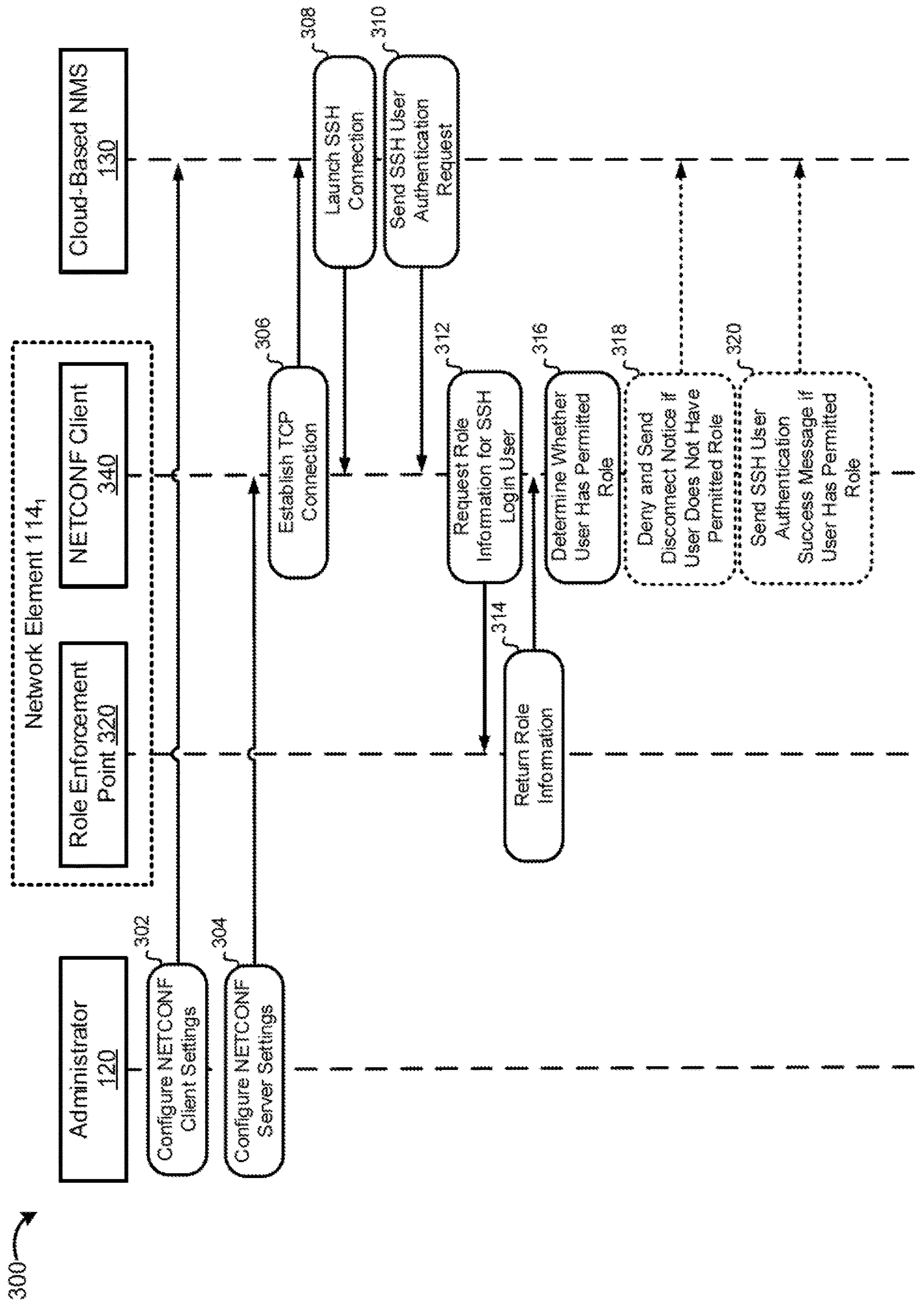
FIG. 3 is a sequence diagram depicting example operations related to role-based access control for remote network services, according to certain embodiments.

FIG. 3 is a sequence diagram 300 depicting operations related to role-based access control for remote network services, according to certain embodiments. Sequence diagram 300 includes administrator 120, a network element 114, and cloud-based NMS 130 of FIG. 1. Sequence diagram 300 relates to an embodiment in which a network configuration protocol (NETCONF) call home procedure is used. NETCONF is an Internet Engineering Task Force® (IETF) network management protocol that provides a secure mechanism for installing, manipulating, and deleting configuration data on a network element, such as a firewall, router, switch, OLT, BNG, or aggregation switch. NETCONF uses SSH as a transport protocol.

At block 302, administrator 120 configures the NETCONF server settings at cloud-based NMS 130. For example, block 302 may correspond to call home server configuration 204 of FIG. 2. The NETCONF server settings may include, for example, an identifier of the NETCONF client such as a media access control (MAC) address or other unique device identifier of network element $\mathbf{114}_1$, a NETCONF service display name, a user identifier (e.g., user name), a user credential (e.g., password), a connection timeout, and/or the like.

At block 304, administrator 120 configures the NETCONF client settings at network element $\mathbf{114}_1$. For example, block 304 may correspond to call home client configuration 202 of FIG. 2. The NETCONF client settings may include, for example, an indication of the name of the NETCONF server, an indication that the call home type is SSH, an address of the NETCONF server such as an IP address or FQDN of cloud-based NMS 130, a port associated with the NETCONF server, one or more permitted roles of the NETCONF server such that only users associated with the one or more permitted roles can access the NETCONF client, and/or the like.

At block 306, a NETCONF client 340 (e.g., a component of network element $\mathbf{114}_1$ that was configured via the NETCONF client settings at block 304) on network element $\mathbf{114}_1$ establishes a TCP connection with cloud-based NMS 130. For example, at block 306, NETCONF client 340 may initiate a TCP connection and request establishment of an SSH connection with cloud-based NMS 130, such as based on the NETCONF client settings.

At block 308, cloud-based NMS 130 may launch an SSH connection with NETCONF client 340, per the request sent at block 306.

At block 310, cloud-based NMS 130 sends an SSH user authentication request to NETCONF client 340, such as via the TCP connection established at block 306 and/or the SSH connection established at block 308. For example, cloud-based NMS 130 may determine the MAC address of network element $\mathbf{114}_1$ based on information sent to cloud-based NMS 130 at block 306, and may determine a user identifier and user credential to send in the SSH user authentication request based on the MAC address being associated with the user identifier and user credential in the NETCONF server settings configured at block 302.

While not shown, NETCONF client 340 may communicate with an identification service (e.g., identification service 116 of FIGS. 1 and 2) in order to authenticate the user credential included in the SSH user authentication request. If the user credential is not successfully authenticated, operations may proceed to block 318 where a denial and disconnect notice may be sent to cloud-based NMS 130. Otherwise, if the user credential is successfully authenticated, network element $\mathbf{114}_1$ may continue to block 312, or block 312 may be performed prior to or in parallel with the user credential authentication, and operations may otherwise continue upon successful user credential authentication.

At block 312, NETCONF client 340 requests role information for the SSH login user (e.g., identified by the user identifier included in the SSH user authentication request) from a role enforcement point 320 of network element $\mathbf{114}_1$. Role enforcement point 320 generally represents a component of network element $\mathbf{114}_1$ that maintains associations between users and roles and associations between roles and permissions, such as those defined via user-role associations and role-permission associations 124 of FIG. 1.

At block 314, role enforcement point 320 returns role information for the SSH login user to NETCONF client 340. The role information may include an indication of one or more roles associated with the SSH login user and one or more permissions associated with the one or more roles.

At block 316, NETCONF client 340 determines whether the user has a permitted role. For example NETCONF client 340 may determine whether the role information indicates that the SSH login user is associated with a role that is associated with a permission to access, manage, and/or otherwise engage in a call home procedure with network element $\mathbf{114}_1$.

If the SSH login user does not have a permitted role, then NETCONF client 340 may send a denial and disconnect notice to cloud-based NMS 130 at block 318. For example, the denial and disconnect notice may indicate that the SSH login user is not authorized to engage in a call home procedure with network element $\mathbf{114}_1$, that the SSH connection and the TCP connection will be ended, and NETCONF client 340 may discontinue the SSH and TCP connections.

Otherwise, if the SSH login user does have a permitted role, NETCONF client 340 may send an SSH user authentication success message at block 320. For example, the SSH user authentication request message may indicate that the SSH login user was successfully authenticated and that the SSH login user has the appropriate permission to engage in a call home procedure with NETCONF client 340. Upon successful SSH user login, a NETCONF call home procedure may have been established between NETCONF client 340 and cloud-based NMS 130 such that cloud-based NMS 130 is able to receive data from network element $\mathbf{114}_1$ provide data to network element $\mathbf{114}_1$, and/or otherwise perform management functionality with respect to network element $\mathbf{114}_1$ via the established SSH connection.

Figure 4:
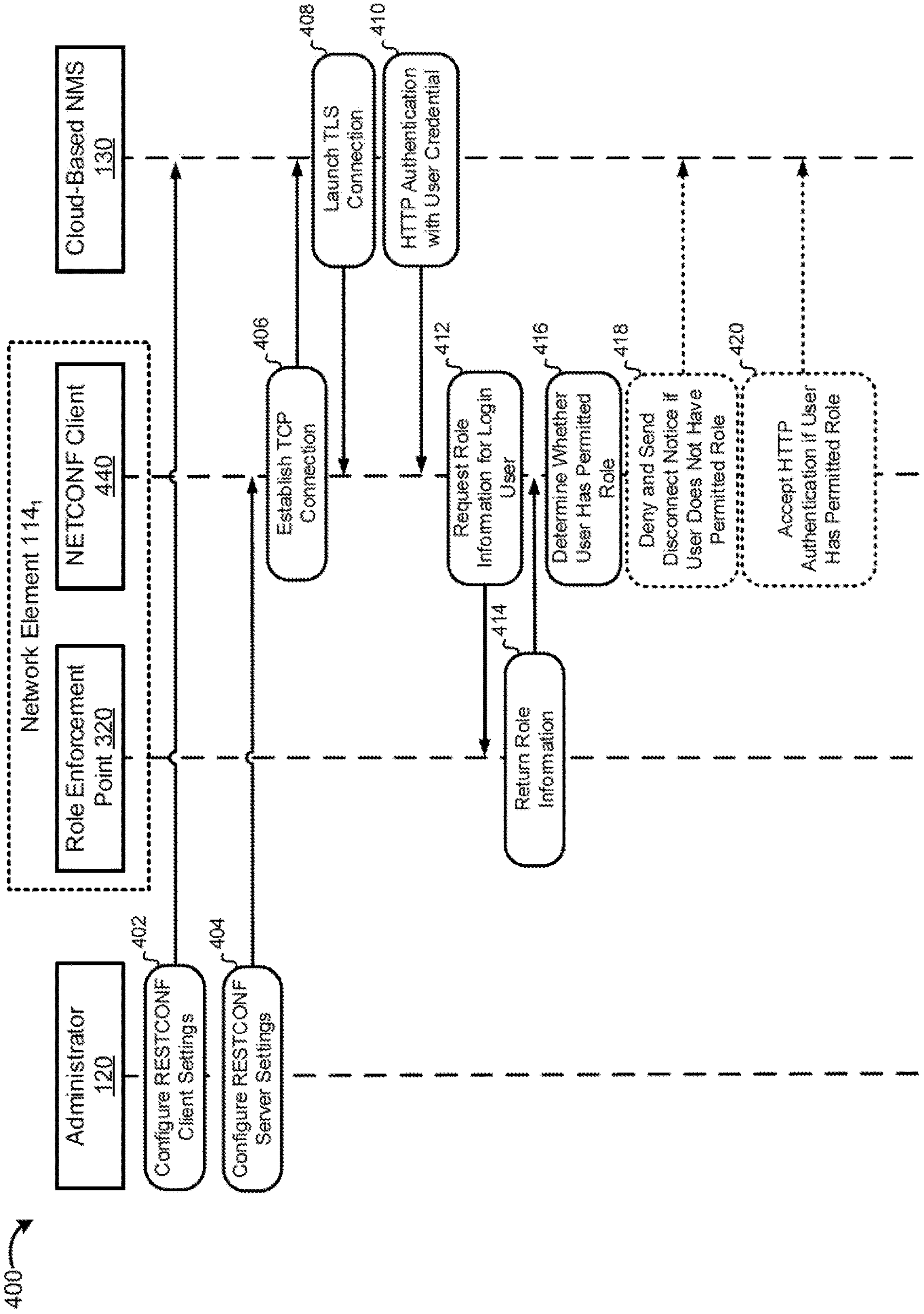
FIG. 4 is a sequence diagram depicting example operations related to role-based access control for remote network services, according to certain embodiments.

FIG. 4 is a sequence diagram 400 depicting operations related to role-based access control for remote network services, according to certain embodiments. Sequence diagram 400 includes administrator 120, a network element 114, and cloud-based NMS 130 of FIG. 1. Sequence diagram 400 relates to an embodiment in which a representational state transfer configuration protocol (RESTCONF) call home procedure is used. RESTCONF is an Internet Engineering Task Force® (IETF) network management protocol that provides a programmatic interface based on standard mechanisms for accessing configuration data, state data, data-model-specific remote procedure call (RPC) operations and events, and/or the like. While NETCONF uses SSH as a transport protocol, RESTCONF uses hypertext transfer protocol secure (HTTPS) as a transport protocol. SSH generally provides more security and reliability features than HTTPS, such as encryption, authentication, compression, and the like, but HTTPS is more widely supported and generally easier to integrate with web applications and tools.

At block 402, administrator 120 configures the RESTCONF server settings at cloud-based NMS 130. For example, block 402 may correspond to call home server configuration 204 of FIG. 2. The RESTCONF server settings may include, for example, an identifier of the RESTCONF client such as a media access control (MAC) address or other unique device identifier of network element $\mathbf{114}_1$, a RESTCONF service display name, a user identifier (e.g., user name), a user credential (e.g., password), a connection timeout, and/or the like.

At block 404, administrator 120 configures the RESTCONF client settings at network element $\mathbf{114}_1$. For example, block 404 may correspond to call home client configuration 202 of FIG. 2. The RESTCONF client settings may include, for example, an indication of the name of the RESTCONF server, an indication that the call home type is HTTPS, an address of the RESTCONF server such as an IP address or FQDN of cloud-based NMS 130, a port associated with the RESTCONF server, one or more permitted roles of the RESTCONF server such that only users associated with the one or more permitted roles can access the RESTCONF client, and/or the like.

At block 406, a RESTCONF client 440 (e.g., a component of network element $\mathbf{114}_1$ that was configured via the RESTCONF client settings at block 404) on network element $\mathbf{114}_1$ establishes a TCP connection with cloud-based NMS 130. For example, at block 406, RESTCONF client 440 may initiate a TCP connection and request establishment of an HTTPS connection with cloud-based NMS 130, such as based on the RESTCONF client settings. At block 408, cloud-based NMS 130 launches a transport layer security (TLS) connection with RESTCONF client 440, per the request sent at block 406. HTTPS generally relies on TLS to encrypt requests and responses, and to digitally sign those requests and responses, which is why a TLS connection is established at block 408.

At block 410, cloud-based NMS 130 sends an HTTPS user authentication request to RESTCONF client 440, such as via the TCP connection established at block 406 and/or the TLS connection established at block 408. For example, cloud-based NMS 130 may determine the MAC address of network element $\mathbf{114}_1$ based on information sent to cloud-based NMS 130 at block 406, and may determine a user identifier and user credential to send in the HTTPS user authentication request based on the MAC address being associated with the user identifier and user credential in the RESTCONF server settings configured at block 402.

While not shown, RESTCONF client 440 may communicate with an identification service (e.g., identification service 116 of FIGS. 1 and 2) in order to authenticate the user credential included in the HTTPS user authentication request. If the user credential is not successfully authenticated, operations may proceed to block 418 where a denial and disconnect notice may be sent to cloud-based NMS 130. Otherwise, if the user credential is successfully authenticated, network element $\mathbf{114}_1$ may continue to block 412, or block 412 may be performed prior to or in parallel with the user credential authentication, and operations may otherwise continue upon successful user credential authentication.

At block 412, RESTCONF client 440 requests role information for the HTTPS login user (e.g., identified by the user identifier included in the HTTPS user authentication request) from role enforcement point 320 of network element $\mathbf{114}_1$. At block 414, role enforcement point 320 returns role information for the HTTPS login user to RESTCONF client 440. The role information may include an indication of one or more roles associated with the HTTPS login user and one or more permissions associated with the one or more roles.

At block 416, RESTCONF client 440 determines whether the user has a permitted role. For example, RESTCONF client 440 may determine whether the role information indicates that the HTTPS login user is associated with a role that is associated with a permission to access, manage, and/or otherwise engage in a call home procedure with network element $\mathbf{114}_1$.

If the HTTPS login user does not have a permitted role, then RESTCONF client 440 may send a denial and disconnect notice to cloud-based NMS 130 at block 418. For example, the denial and disconnect notice may indicate that the HTTPS login user is not authorized to engage in a call home procedure with network element $\mathbf{114}_1$, that the TLS connection and the TCP connection will be ended, and RESTCONF client 440 may discontinue the TLS and TCP connections.

Otherwise, if the HTTPS login user does have a permitted role, RESTCONF client 440 may send an HTTPS user authentication success message at block 420. For example, the HTTPS user authentication request message may indicate that the HTTPS login user was successfully authenticated and that the HTTPS login user has the appropriate permission to engage in a call home procedure with RESTCONF client 440. Upon successful HTTPS user login, a RESTCONF call home procedure may have been established between RESTCONF client 440 and cloud-based NMS 130 such that cloud-based NMS 130 is able to receive data from network element 114$_1$ provide data to network element 114$_1$, and/or otherwise perform management functionality with respect to network element 114$_1$ via the established TLS connection (e.g., which may enable HTTPS communication).

Figure 5:
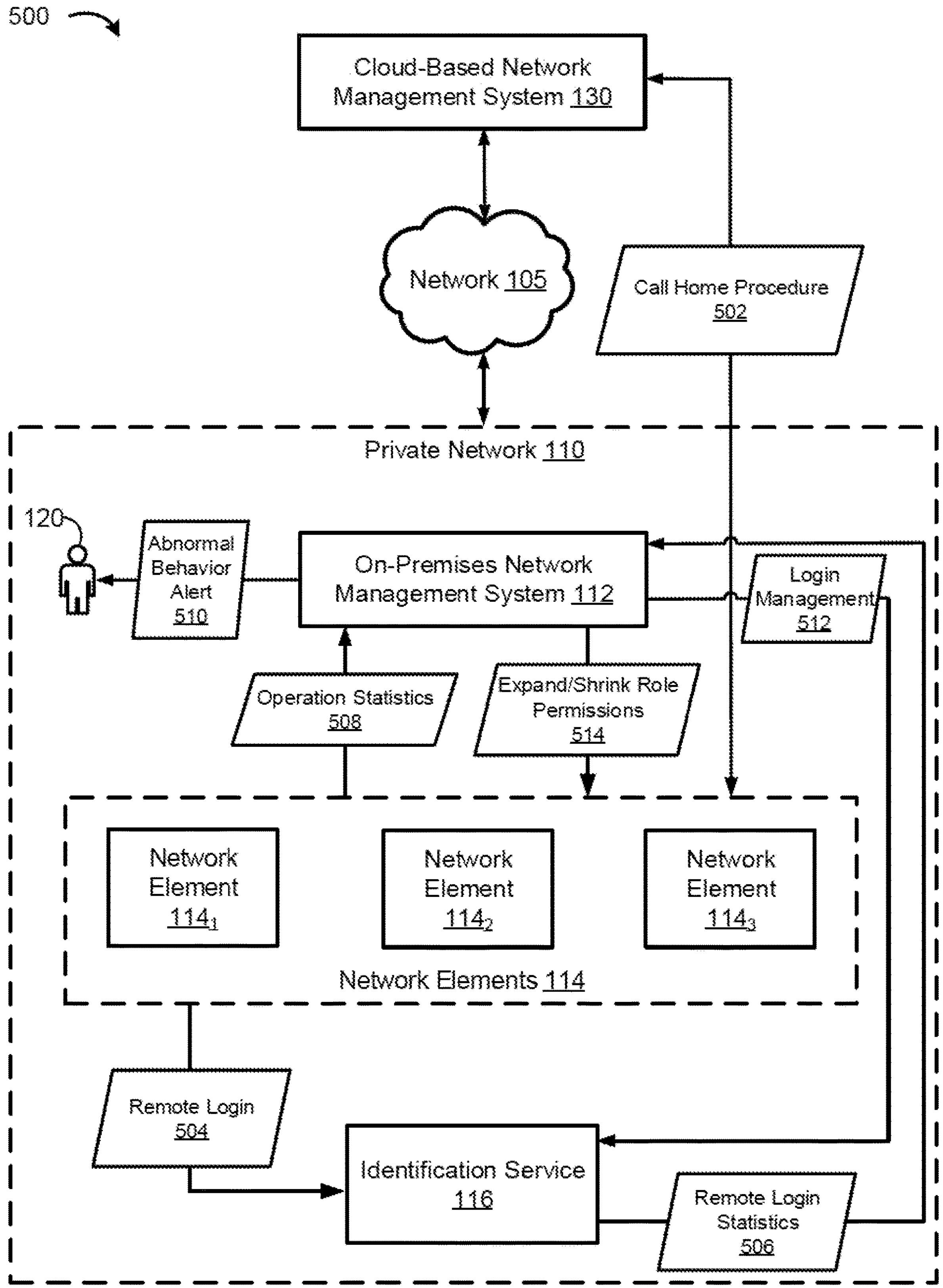
FIG. 5 is an illustration of an example networking environment in which operations related to role-based access control for remote network services may be performed, according to certain embodiments.

FIG. 5 is an illustration 500 of a networking environment in which operations related to role-based access control for remote network services may be performed, according to certain embodiments. Illustration 500 includes cloud-based NMS 130, network 105, private network 110, administrator 120, on-premises NMS 112, network elements 114, and identification service 116 of FIGS. 1 and 2. In particular, illustration 500 represents functionality related to dynamic behavior analysis for security threat detection prevention, and response, such as during establishment of and/or ongoing operations related to a call home procedure 502 as described herein. Call home procedure 502 may encompass various aspects related to establishment of an ongoing operations related to a call home procedure as described above with respect to FIGS. 1-4. Remote login 504 generally corresponds to a request to authenticate a user via identification service 116 in connection with call home procedure 502 (e.g., a user credential sent from cloud-based NMS 130 to a network element 114).

Remote login statistics 506 may be sent from identification service 116 to on-premises NMS 112 for analysis. For example, remote login statistics 506 may include information related to remote login 504 and/or other attempts by remote entities to login to network elements 114, such as the user identifiers and/or user credentials provided with such login attempts, the identifiers, addresses, and/or other attributes of remote entities initiating such login attempts, the times and/or frequencies of such login attempts, and/or the like. On-premises NMS 112 may analyze remote login statistics 506, such as according to rules, using one or more machine learning models, and/or other logic for detecting abnormal behavior and/or otherwise problematic circumstances.

On-premises NMS 112 may take action upon detecting a pattern or other indicator of abnormal behavior in connection with analyzing remote login statistics 506. For example, if on-premises NMS 112 determines a potentially problematic circumstance, such as abnormal remote login behavior, on-premises NMS 112 may perform login management 512 in order to block, delay, and/or otherwise manage a remote login operation (e.g., remote login 504). In one example, upon detecting abnormal behavior in connection with remote login 504, on-premises NMS 112 may block remote login 504 and/or otherwise delay remote login 504 (e.g., until administrator 120 reviews and provides feedback with respect to an abnormal behavior alert 510 generated based on the abnormal behavior, such as either indicating that remote login 504 should be allowed to continue despite the alert or indicating that remote login 504 should be blocked).

On-premises NMS 112 may also generate one or more abnormal behavior alerts 510 based on detecting abnormal behavior in connection with remote login statistics 506. An abnormal behavior alert 510 may, for example, indicate that abnormal behavior was detected and/or include details related to the abnormal behavior, such as the particular information and/or operations that triggered the alert and/or the particular rule(s), logic, and/or machine learning model(s) that resulted in the alert being generated. An abnormal behavior alert 510 may further be associated with one or more mechanisms (e.g., user interface controls) by which administrator 120 can provide feedback with respect to the alert, such as indicating whether the alert should be ignored (e.g., allowing operations to proceed) or whether an operation should be performed (e.g., blocking a user or operation, and/or the like).

Operation statistics 508 may be provided from one or more network elements 114 to on-premises NMS 112, such as including information about operations performed by network element(s) 114 and/or cloud-based NMS 130 in connection with call home procedure 502. Operation statistics 508 may include information related to communications sent between network element(s) 114 and cloud-based NMS 130, management operations and/or other operations performed by cloud-based NMS 130 with respect to network element(s) 130, and/or other behavior within private network 110 and/or cloud-based NMS 130.

On-premises NMS 112 may analyze operation statistics 508, such as according to rules, using one or more machine learning models, and/or other logic for detecting abnormal behavior and/or otherwise problematic circumstances. On-premises NMS 112 may take action upon detecting a pattern or other indicator of abnormal behavior in connection with analyzing operation statistics. For example, if on-premises NMS 112 determines a potentially problematic circumstance, such as abnormal behavior, on-premises NMS 112 may perform expanding and/or shrinking of role permissions 514 and/or changing of roles assigned to a user, such as to prevent a user associated with abnormal behavior from performing one or more operations. On-premises NMS 112 may also or additionally generate an abnormal behavior alert 510 upon detecting abnormal behavior, such as notifying administrator 120 of detected abnormal behavior, providing details associated with the detected abnormal behavior, and/or giving administrator 120 an opportunity to provide feedback with respect to the alert (e.g., indicating that role permissions should be shrunk or expanded, and/or that other action should be taken).

Abnormal behavior detection may be based on one or more rules, such as configured by administrator 120. An example of such a rule includes a detection of abnormal behavior (e.g., indicating a potential brute force hacking attempt or other potential security issue) if a threshold number of remote login attempts (e.g., with the same or different user credentials) are received within a threshold amount of time, such as from the same endpoint or different endpoints. Another example rule may relate to attributes of endpoints attempting to remotely login, such as whether an endpoint that is not known by a network element 114 to be configured as a call home client and/or that otherwise has one or more particular attributes (e.g., geographic location, network of origin, and/or the like) attempts to remotely login to a network element 114. Another example rule may relate to actions performed by a remote entity (e.g., cloud-based NMS 130) after a call home procedure is successfully established, such as whether the remote entity attempts to perform an action (e.g., accessing and/or modifying a particular resource or data item) that would not be expected to be performed in connection with a call home procedure.

In some embodiments, one or more machine learning models may be used for detecting abnormal behavior. For example, a machine learning model may be trained through a supervised learning process based on labeled training data, such as historical operation data associated with labels indicating whether the historical operation data indicated abnormal behavior (e.g., based on manual review by an administrator or other expert). Once the machine learning model is trained, operation data may be provided as inputs to the machine learning model (e.g., based on remote login statistics 506 and/or operation statistics 508), and the machine learning model may output an indication of whether abnormal behavior is detected.

Rules and/or models used in abnormal behavior detection may be updated over time, such as based on feedback from administrator 120. For example, if administrator 120 provides feedback indicating that an abnormal behavior alert 510 was a false positive or otherwise should be ignored (e.g., by rejecting or closing out of the alert without taking action, and/or through explicit feedback), or indicating that an abnormal behavior 510 was a true positive (e.g., by approving the alert, taking action based on the alert, and/or through explicit feedback), such feedback may be used to update one or more rules and/or re-train one or more machine learning models that were used to generate the alert. Thus, techniques described herein may provide behavior analysis and threat detection that dynamically improves over time in an interactive feedback loop.

FIG. 6 depicts example operations 600 for role-based access control for remote network services, according to certain embodiments. For example, operations 600 may be performed by one or more components described above with respect to FIGS. 1-5. In one embodiment, operations 600 are performed by a network element 114, cloud-based NMS 130, on-premises NMS 112 and/or identification service 116 of FIGS. 1-5.

Operations 600 begin at step 602, with initiating, by a network element in a network, a connection to a service provider system outside of the network.

Operations 600 continue at step 604, with receiving, by the network element from the service provider system via the connection in response to the initiating, a login request comprising a user identifier.

Operations 600 continue at step 606, with receiving determining, by the network element, one or more permissions associated with a role corresponding to the user identifier.

Operations 600 continue at step 608, with approving, blocking, or delaying approval of the login request, by the network element, based on the one or more permissions.

Some embodiments further comprise authenticating, by the network element, a credential included in the login request through interaction between the network element and an identification service in the network.

Certain embodiments further comprise receiving, by the network element, configuration information from an on-premises service provider system in the network specifying a first association between the user identifier and the role and a second association between the role and the one or more permissions. Certain embodiments further comprise providing, by the network element, data related to one or more events associated with the network element to the on-premises service provider system and detecting, by the on-premises service provider system, abnormal behavior based on the data related to the one or more events associated with the network element. Some embodiments further comprise receiving, by the network element from the on-premises service provider system, a change to the first association or the second association based on the detecting of the abnormal behavior.

In some embodiments, the connection comprises a transmission control protocol (TCP) connection between the network element and the service provider system.

In certain embodiments, the login request comprises a request to establish a secure shell (SSH) or hypertext transfer protocol secure (HTTPS) connection between the service provider system and the network element.

In some embodiments, the network element comprises one or more of: a gateway, a switch, a router, a network security component, a load balancer, an optical line terminal (OLT), a broadband network gateway (BNG), or an aggregation switch.

In certain embodiments, the service provider system comprises a cloud-based network monitoring system.

Some embodiments further comprise approving the login request, by the network element, based on the one or more permissions, and providing, by the network element to the service provider system based on the approving, performance data relating to operations performed by the network element.

Each node, element, and/or device in the network(s) described herein may comprise and/or may be implemented via one or more computing devices capable of executing software code to perform the processing steps described herein. Such a device may include a processor, memory, interfaces, high-speed expansion ports, and interconnected busses. The processor can process instructions for execution within the computing device, including instructions stored in the memory or on a storage device to display graphical information for a (graphical user interface) GUI on an external input/output (I/O) device, such as a display coupled to high speed interface. In other implementations, multiple processors and/or multiple busses may be used, as appropriate, along with multiple memories and types of memory.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In an embodiment, an ASIC design can be used to implement system algorithms as well as hardware accelerated designs for specific use cases.

These computer programs (also known as programs, software, software applications or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The present disclosure, in various embodiments, includes components, methods, processes, systems and/or apparatus substantially as depicted and described herein, including various embodiments, subcombinations, and subsets thereof. Those of ordinary skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

We claim:

1. A method of role-based access control for remote network services, comprising:

- initiating, by a network element in a network, a network connection to a cloud-based network management system outside of the network using an address of the cloud-based network management system that is indicated in client configuration information;
- receiving, by the network element from the cloud-based network management system via the network connection in response to the initiating, a login request comprising a user identifier, wherein the login request is generated by the cloud-based network management system based on server configuration information that indicates the user identifier in association with a corresponding address of the network element, and wherein the login request comprises a request by the cloud-based network management system to login to the network element to perform management functionality;
- determining, by the network element, one or more permissions associated with a role corresponding to the user identifier based on user-role associations and role-permission associations indicated in configuration information received by the network element from an on-premises network management system; and
- approving, blocking, or delaying approval of the login request, by the network element, based on whether the one or more permissions include a permission to perform the management functionality with respect to the network element.

2. The method of claim 1, further comprising authenticating, by the network element, a credential included in the login request through interaction between the network element and an identification service in the network.

3. The method of claim 1, further comprising receiving, by the network element, configuration information from an on-premises service provider system in the network specifying a first association between the user identifier and the role and a second association between the role and the one or more permissions.

4. The method of claim 3, further comprising:

- providing, by the network element, data related to one or more events associated with the network element to the on-premises service provider system; and
- detecting, by the on-premises service provider system, abnormal behavior based on the data related to the one or more events associated with the network element.

5. The method of claim 4, further comprising receiving, by the network element from the on-premises service provider system, a change to the first association or the second association based on the detecting of the abnormal behavior.

6. The method of claim 1, wherein the network connection comprises a transmission control protocol (TCP) connection between the network element and the cloud-based network management system.

7. The method of claim 1, wherein the login request comprises a request to establish a secure shell (SSH) or hypertext transfer protocol secure (HTTPS) connection between the cloud-based network management system and the network element.

8. The method of claim 1, wherein the network element comprises one or more of: a gateway, a switch, a router, a network security component, a load balancer, an optical line terminal (OLT), a broadband network gateway (BNG), or an aggregation switch.

9. The method of claim 1, further comprising:

- approving the login request, by the network element, based on the one or more permissions; and
- providing, by the network element to the cloud-based network management system based on the approving, performance data relating to operations performed by the network element.

10. A system for role-based access control for remote network services, comprising:

- one or more processors; and
- a memory storing instructions that, when executed by the one or more processors, cause the system to:
  - initiate, by a network element in a network, a network connection to a cloud-based network management system outside of the network using an address of the cloud-based network management system that is indicated in client configuration information;
  - receive, by the network element from the cloud-based network management system via the network connection in response to the initiating, a login request comprising a user identifier, wherein the login request is generated by the cloud-based network management system based on server configuration information that indicates the user identifier in association with a corresponding address of the network element, and wherein the login request comprises a request by the cloud-based network management system to login to the network element to perform management functionality;
  - determine, by the network element, one or more permissions associated with a role corresponding to the user identifier based on user-role associations and role-permission associations indicated in configuration information received by the network element from an on-premises network management system; and approve, blocking, or delaying approval of the login request, by the network element, based on whether the one or more permissions include a permission to perform the management functionality with respect to the network element.

11. The system of claim 10, wherein the instructions, when executed by the one or more processors, further cause the system to authenticate, by the network element, a credential included in the login request through interaction between the network element and an identification service in the network.

12. The system of claim 10, wherein the instructions, when executed by the one or more processors, further cause the system to receive, by the network element, configuration information from an on-premises service provider system in the network specifying a first association between the user identifier and the role and a second association between the role and the one or more permissions.

13. The system of claim 12, wherein the instructions, when executed by the one or more processors, further cause the system to:

provide, by the network element, data related to one or more events associated with the network element to the on-premises service provider system; and detect, by the on-premises service provider system, abnormal behavior based on the data related to the one or more events associated with the network element.

14. The system of claim 13, wherein the instructions, when executed by the one or more processors, further cause the system to receive, by the network element from the on-premises service provider system, a change to the first association or the second association based on the detecting of the abnormal behavior.

15. The system of claim 10, wherein the network connection comprises a transmission control protocol (TCP) connection between the network element and the cloud-based network management system.

16. The system of claim 10, wherein the login request comprises a request to establish a secure shell (SSH) or hypertext transfer protocol secure (HTTPS) connection between the cloud-based network management system and the network element.

17. The system of claim 10, wherein the network element comprises one or more of: a gateway, a switch, a router, a network security component, a load balancer, an optical line terminal (OLT), a broadband network gateway (BNG), or an aggregation switch.

18. A non-transitory computer readable medium comprising instructions that, when executed by one or more processors of a computing system, cause the computing system to:

initiate, by a network element in a network, a network connection to a cloud-based network management system outside of the network using an address of the cloud-based network management system that is indicated in client configuration information;

receive, by the network element from the cloud-based network management system via the network connection in response to the initiating, a login request comprising a user identifier, wherein the login request is generated by the cloud-based network management system based on server configuration information that indicates the user identifier in association with a corresponding address of the network element, and wherein the login request comprises a request by the cloud-based network management system to login to the network element to perform management functionality;

determine, by the network element, one or more permissions associated with a role corresponding to the user identifier based on user-role associations and role-permission associations indicated in configuration information received by the network element from an on-premises network management system; and approve, blocking, or delaying approval of the login request, by the network element, based on whether the one or more permissions include a permission to perform the management functionality with respect to the network element.

* * * * *